(12) United States Patent
Kim et al.

(10) Patent No.: US 7,060,387 B2
(45) Date of Patent: Jun. 13, 2006

(54) SECONDARY CELL WITH IMPROVED ELECTRODE JELLY-ROLL STRUCTURE

(75) Inventors: You-Mee Kim, Cheonan (KR); Jeong-Soon Shin, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 397 days.

(21) Appl. No.: 10/256,262

(22) Filed: Sep. 27, 2002

(65) Prior Publication Data

US 2003/0072993 A1 Apr. 17, 2003

(30) Foreign Application Priority Data

Oct. 16, 2001 (KR) .............................. 2001-63715

(51) Int. Cl.
*H01M 6/10* (2006.01)
*H01M 2/18* (2006.01)
*H01M 2/14* (2006.01)

(52) U.S. Cl. ..................... 429/94; 429/164; 429/130; 429/254; 29/623.1; 29/623.5

(58) Field of Classification Search ................ 429/94, 429/164, 130, 254; 29/623.1, 623.5
See application file for complete search history.

(56) References Cited

U.S. PATENT DOCUMENTS

| 5,571,632 A | 11/1996 | Teramoto ..................... 429/94 |
| 6,114,059 A * | 9/2000 | Watanabe et al. ........... 429/120 |

FOREIGN PATENT DOCUMENTS

| JP | 8-153542 | 6/1996 |
| JP | 08-153542 | * 6/1996 |
| JP | 8-273698 | 10/1996 |

* cited by examiner

*Primary Examiner*—Patrick Joseph Ryan
*Assistant Examiner*—Angela J. Martin
(74) *Attorney, Agent, or Firm*—Robert E. Bushnell, Esq.

(57) ABSTRACT

A secondary cell capable of ensuring thermal and mechanical stabilities required for a high-capacity cell with a simple structure is provided. The secondary cell includes: a can; and an electrode jelly-roll wound with two different electrodes and a separator interposed between the electrodes therein and accommodated in the can, the outer surface of the electrode jelly-roll being wound around one more turn with the separator. Only the separator is wound at the core of the electrode jelly-roll to form a rod-like stability member which is cured by absorbing heat generated from the cell. The separator wound at the core of the electrode jelly-roll is continuous from a portion of the separator which is stacked with the two different electrodes.

38 Claims, 8 Drawing Sheets

SECONDARY CELL WITH IMPROVED ELECTRODE JELLY-ROLL STRUCTURE

CLAIM OF PRIORITY

This application makes reference to, incorporates the same herein, and claims all benefits accruing under 35 U.S.C. §119 from my application entitled ELECTRODE JELLY-ROLL OF SECONDARY CELL filed with the Korean Industrial Property Office on 16 Oct. 2001 and there duly assigned Ser. No. 2001-63715.

BACKGROUND OF THE INVENTION

1. Field of the Invention

The present invention relates to a secondary cell with an electrode jelly roll in which a cathode, separator, and anode are wound together, and more particularly, a secondary cell with an electrode jelly-roll, which is improved in structural and thermal stabilities.

2. Description of the Related Art

Secondary cells are rechargeable and can be made into a smaller size with high capacity. Typical examples of secondary cells include nickel-metal hydride (Ni-MH) cells, lithium cells, lithium ion cells (Li-ion), and polymer lithium cells. Secondary cells are classified into cylindrical cells, rectangular cells, pouch type cells containing electrode jelly-rolls in pouches.

A secondary cell includes an electrode jelly-roll wound to be circular or elliptical. The electrode jelly-roll is attained by coating a substrate with an active material, and drying, roll-pressing and cutting the substrate to form a cathode and anode, and by winding the cathode and anode with a separator therebetween. A circular cell is formed by winding the electrode jelly-roll to have a circular cross-section, accommodating it in a cylindrical can, filling the can with an electrolyte solution, and sealing the can. A rectangular cell is formed by flattening the electrode jelly-roll under pressure and accommodating it in a rectangular can.

For example, a cylindrical secondary cell having a structure of an electrode jelly-roll, includes an electrode such as a cathode and anode can be manufactured by different methods according to the type of electrode. In general a cathode and anode are formed by coating a slurry containing a cathode active material and a slurry containing an anode active material on both sides of respective substrates, and drying, roll-pressing and cutting the substrates to a predetermined size. A separator is interposed between the cathode and the anode to prevent the cathode and anode from being electrically connected, and then wound in a roll.

The resulting electrode jelly-roll is placed in a can, a cap assembly is mounted on the top of the can to be connected with the cathode of the electrode jelly-roll, and the can is filled with an electrolyte solution and sealed, resulting in a cylindrical cell.

In such a cylindrical cell, the anode substrate contacts the inner wall of the can at the outer-side of the electrode jelly-roll, or an anode tap welded to the anode substrate contacts the bottom of the can. A tap at the core of the electrode jelly-roll, extending from the cathode substrate, is connected to the cap assembly. On the top and bottom surfaces of the electrode jelly-roll, insulating plates are placed to prevent short-circuiting between the cap assembly and the can.

Many efforts have been made to manufacture a high-capacity cell by tightly winding thin, long electrodes such that a large amount of active material can be incorporated into the cylindrical cell having the structure described above.

Another consideration to be taken into account in manufacturing a high-capacity cell is the mechanical and thermal stabilities of the cell.

A problem of thermal stability in a cell is caused as a result of the heat generated from the reaction in the cell cannot be effectively dissipated. This problem occurs when the electrodes of the cell are tightly wound so that the heat generated from the inside cannot be effectively dissipated to the outside. As a result, the temperature of the cell continues to rise and a thermal runaway phenomenon occurs, thereby degrading the stability of the cell.

A problem of mechanical stability in a cell refers to a reduction in cell stability when the electrodes are damaged due to external environments such as physical impacts.

An effort to improve the heat-dissipating structure of a cell has been made to prevent a reduction in thermal stability of the cell. In particular, U.S. Pat. No. 5,571,632 for *Non-aqueous Electrolyte Solution Secondary Cell and Method for Producing the Same* by Teramoto discloses a "non-aqueous electrolyte secondary cell" having a structure in which the cathode is welded to an inner Al tube and the anode is welded to a Ni foil on the outer side of the electrode jelly-roll.

To manufacture the secondary cell having the structure described above, an inner tube is formed through the can, the electrode is welded to the inner tube, and a separate member is welded to the outer side of the electrode jelly-roll. This structure of the secondary cell adds complexity to the manufacturing process and therefore is burdensome. Also, the structure of the secondary cell differs from that of a conventional cylindrical cell, so equipment commonly used to manufacture the secondary cell should be replaced. In addition, incorporation of such a large-volume inner tube limits to wind the electrode tightly for a high-capacity, compact cell.

SUMMARY OF THE INVENTION

To solve the above-described and other problems, it is an object of the present invention to provide a secondary cell capable of ensuring thermal and mechanical stabilities required for a high-capacity cell with a simple structure.

To achieve the above and other objects of the present invention, there is provided a secondary cell including: a can; and an electrode jelly-roll wound with two different electrodes and a separator interposed between the electrodes therein and accommodated in the can, the outer surface of the electrode jelly-roll being wound around one more turn with the separator.

It is preferable that only the separator is wound at the core of the electrode jelly-roll to form a rod-like stability member which is cured by absorbing heat generated from the cell. In this case, the separator wound at the core of the electrode jelly-roll is continuous from a portion of the separator which is stacked with the two different electrodes.

It is preferable that a substrate of one of the electrodes which is more towards the exterior than the other, the substrate being not coated with an active material, surrounds the outer surface of the electrode jelly-roll in contact with the inner wall of the can. In this case, a polyolefin-based thin film may be additionally formed to coat the substrate surrounding the outer surface of the electrode jelly-roll.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
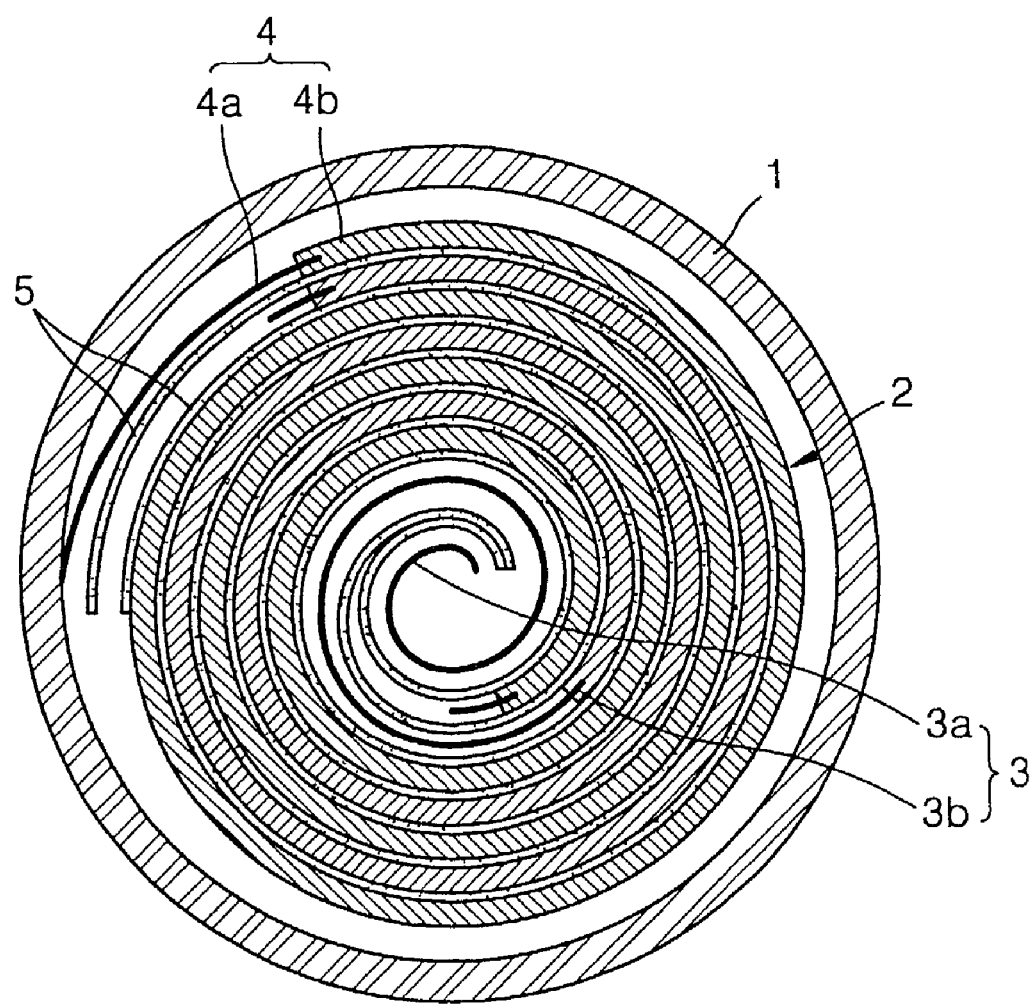
FIG. 1 is a cross-sectional view of the electrode jelly-roll of a conventional secondary cell.

FIG. 1 is a cross-sectional view of a cylindrical secondary cell showing the structure of its electrode jelly-roll.

An electrode such as a cathode and anode can be manufactured by different methods according to the type of electrode. In general, as shown in FIG. 1, a cathode 3 and anode 4 are formed by coating a slurry containing a cathode active material 3b and a slurry containing an anode active material 4b on both sides of respective substrates 3a and 4a, and drying, roll-pressing and cutting the substrates 3a and 3b to a predetermined size. A separator 5 is interposed between the cathode 3 and the anode 4 to prevent the cathode 3 and anode 4 from being electrically connected, and then wound in a roll.

The resulting electrode jelly-roll 2 is placed in a can 1, a cap assembly (not shown) is mounted on the top of the can 1 to be connected with the cathode 3 of the electrode jelly-roll 2, and the can 1 is filled with an electrolyte solution and sealed, resulting in a cylindrical cell.

In such a cylindrical cell, the anode substrate 4a contacts the inner wall of the can 1 at the outer-side of the electrode jelly-roll 2, or an anode tap welded to the anode substrate 4a contacts the bottom of the can 1. A tap at the core of the electrode jelly-roll 2, extending from the cathode substrate 3a, is connected to the cap assembly. On the top and bottom surfaces of the electrode jelly-roll 2, insulating plates are placed to prevent short-circuiting between the cap assembly and the can 1.

Preferred embodiments of the present invention will be described with reference to the appended drawings. Although the preferred embodiment is described with reference to a cylindrical cell having an electrode jelly-roll, the present invention is not limited to the cylindrical cell and can be applicable to any type of cell as long as it includes the electrode jelly-roll described in the preferred embodiment.

Figure 2:
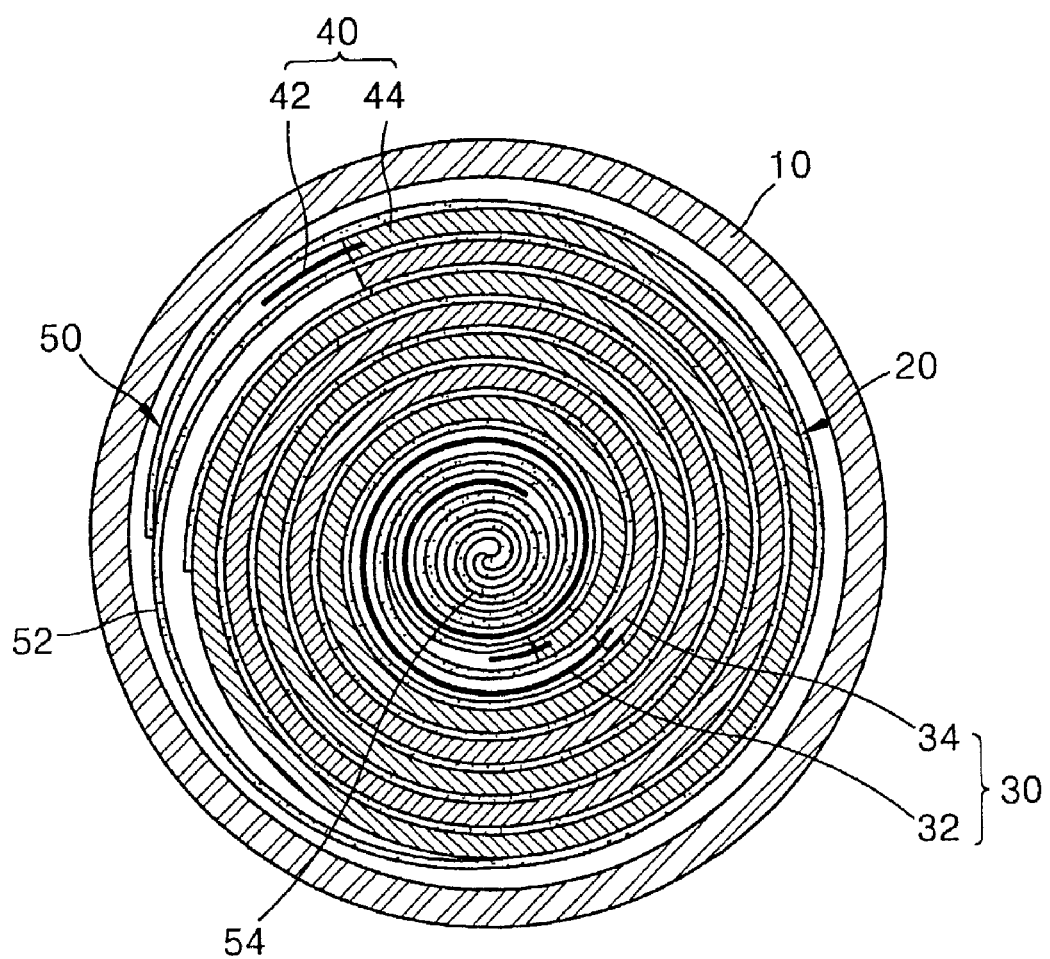
FIG. 2 is a cross-sectional view showing the electrode jelly-roll of a secondary cell according to a preferred embodiment of the present invention.
Figure 3:
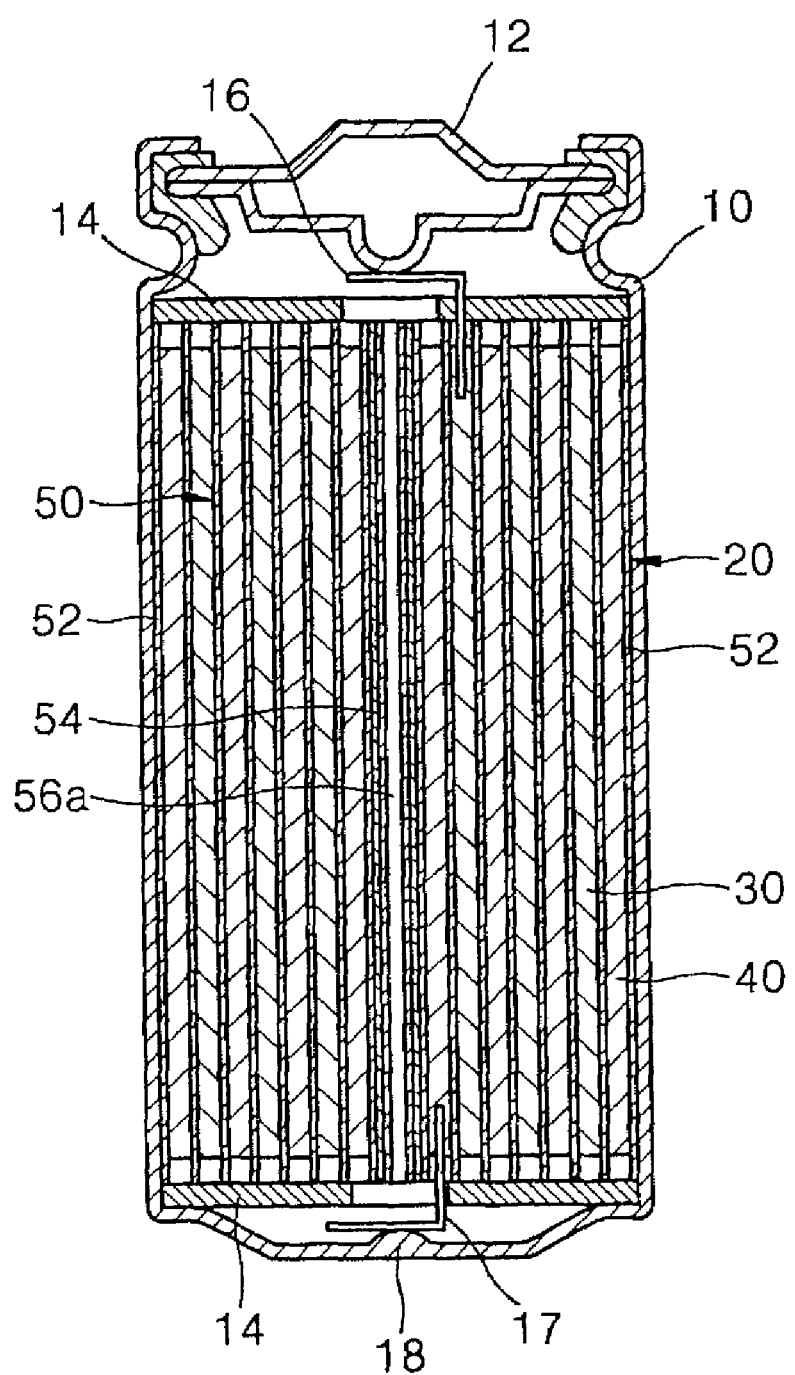
FIG. 3 is a longitudinal sectional view showing the structure of the secondary cell of FIG. 2.

FIG. 2 is a cross-sectional view of a preferred embodiment of a cylindrical secondary cell having an electrode jelly-roll according to the present invention. FIG. 3 is a longitudinal sectional view of the cylindrical secondary cell of FIG. 2. As shown in FIGS. 2 and 3, an electrode jelly-roll 20 wound with a cathode 30, anode 40, and separator 50 therein is accommodated in a can 10. The electrode jelly-roll 20 is attained by sequentially stacking a separator 50, an anode 40 (or cathode 30), a separator 50, and a cathode 30 (or anode 40), and rolling the stack.

The cathode 30 and the anode 40 are formed by depositing active materials 34 and 44 of lithium metal oxide, carbon, or carbon composite on one side or both sides of substrates 32 and 42, respectively. The substrate 32 of the cathode 30 is positioned at the core of the electrode jelly-roll 20 and is connected to a cap assembly 12 via a cathode tap 16, which is welded to the substrate 32. An insulating plate 14 is provided on the top and bottom of the electrode jelly-roll 20 to prevent short-circuiting between the cap assembly 12 and the can 10.

In the electrode jelly-roll of the cell having the structure described above according to the present invention, the separator 50 rolled together with the cathode 30 and the anode 40 is used to dissipate heat from the cell and to provide structural stability.

In particular, the outer surface of the electrode jelly-roll 20 is wrapped with the separator 50 around one more turn to result in an outermost separator 52. Also, at the core of the electrode jelly-roll 20, an innermost separator 54 is additionally interposed as the innermost turn of the electrode jelly-roll 20. It is preferable that the innermost separator 54 is tightly wound at the core of the electrode jelly-roll 20.

The present invention is intended to improve the thermal and mechanical stabilities of the cell by forming additional turns of the separator 50 (i.e., the innermost separator 54 and the outermost separator 52) at the core of the electrode jelly-roll 20 and between the electrode jelly-roll 20 and the can 10.

Suitable materials for the separator include polyethylene (PE), polypropylene (PP), and a composite of PP/PE/PP. The present invention is based on the fact that these materials for the separator easily absorb heat and are thermally cured.

In particular, as the temperature of the cell rises, the outermost separator 52 and the innermost separator 54, which are additionally wound around the outer surface and at the core of the electrode jelly-roll 20, respectively, absorb the heat, providing a heat-dissipating effect. At the same time, the outermost separator 52 and the innermost separator 54 are cured by absorbing the heat, so they act as external and internal protectors for the electrode jelly-roll 20.

Figure 4:
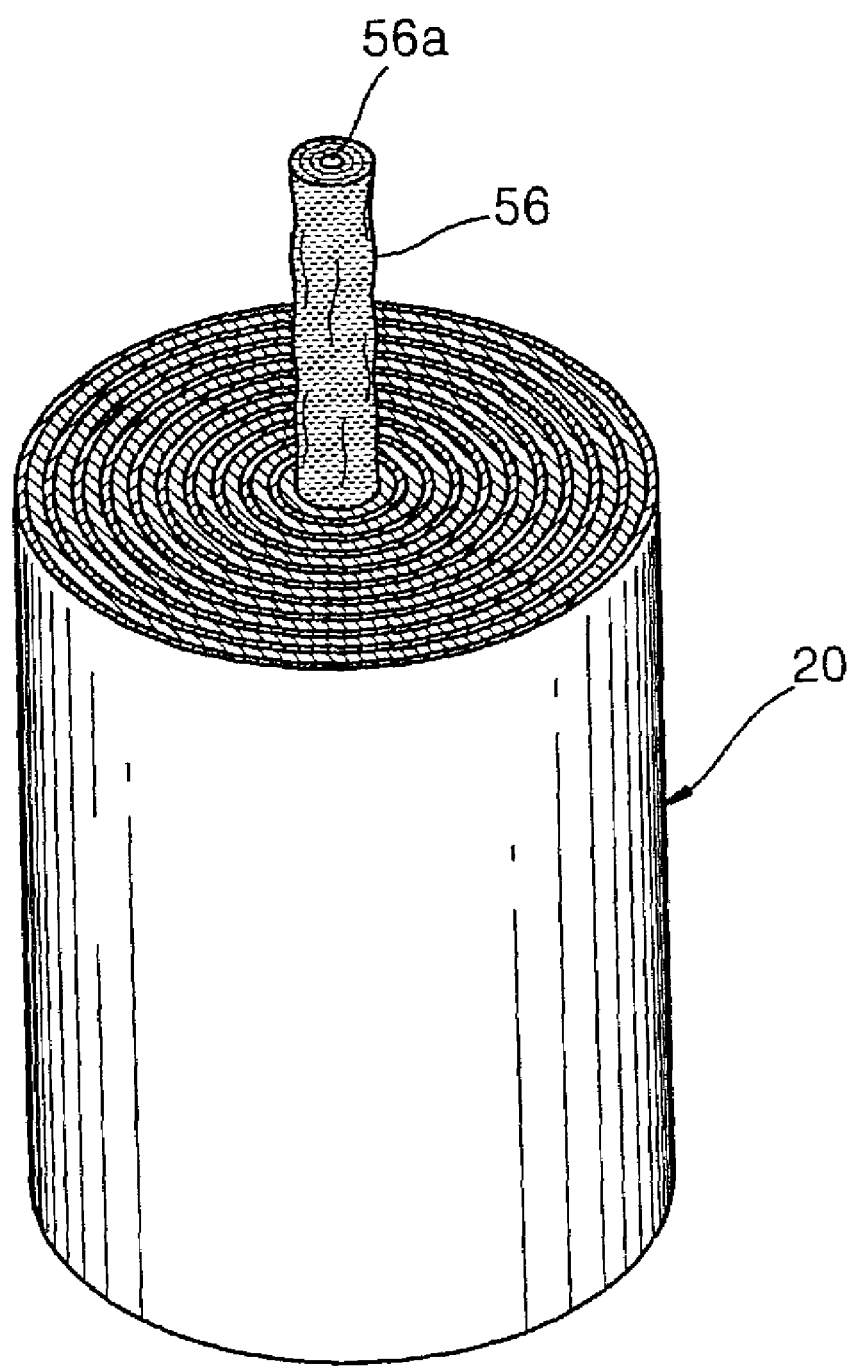
FIG. 4 is a partially cutaway perspective view showing a stability member in the electrode jelly-roll of the secondary cell according to the preferred embodiment of the present invention.

As the innermost separator 54, which is additionally wound at the core of the electrode jelly-roll 20, is cured by absorbing the heat generated inside the cell, a rod-like stability member 56 with a center cavity 56a is formed, as shown in FIG. 4. The rod-like shape of the stability member 56 is more advantageous for mechanical stability than other shapes. The stability member 56 can be used as a mandrel. Unlike the stability member 56, the mandrel is commonly a separate member formed at the center of an electrode jelly-roll. The stability member 56, which is integrally formed from the cured innermost separator 54, has equivalent or better effects than the separately formed mandrel. Furthermore, since the separate mandrel is not necessary, the cell can be tightly rolled with reduced volume.

An appropriate physical stability against external impacts as well as the thermal stability capable of effectively dissipating the heat generated in a cell are important considerations in manufacturing cells. Damage to a cell caused by an external impact significantly affects the cell stability. As a cell is increasingly charged, the volume of the electrode expands so that an edge current flows. This localized current flow increases the likelihood of localized heat generation. In addition, as the thickness of the electrode increases by charging, it is more likely that the edge of the coated electrode is broken.

Therefore, it is necessary to protect the cell from external impacts as well as to effectively dissipate heat from the cell.

The present invention can meet these two requirements by using the outermost separator 52 and the innermost separator 54, which are additionally wound around the outer surface and at the core of the electrode jelly-roll 20, respectively, and are thermally curable.

In the embodiment of the electrode jelly-roll 20 shown in FIGS. 2 and 3, the substrate 42 of the anode 40 does not contact the can 10. Therefore, it is preferable that an additional tap 17 is extended from the anode 40 to contact a projection 18 formed on the inner bottom of the can 10. In FIGS. 2 and 3, the cathode 30 and the anode 40 may be interchangeable.

Figure 5:
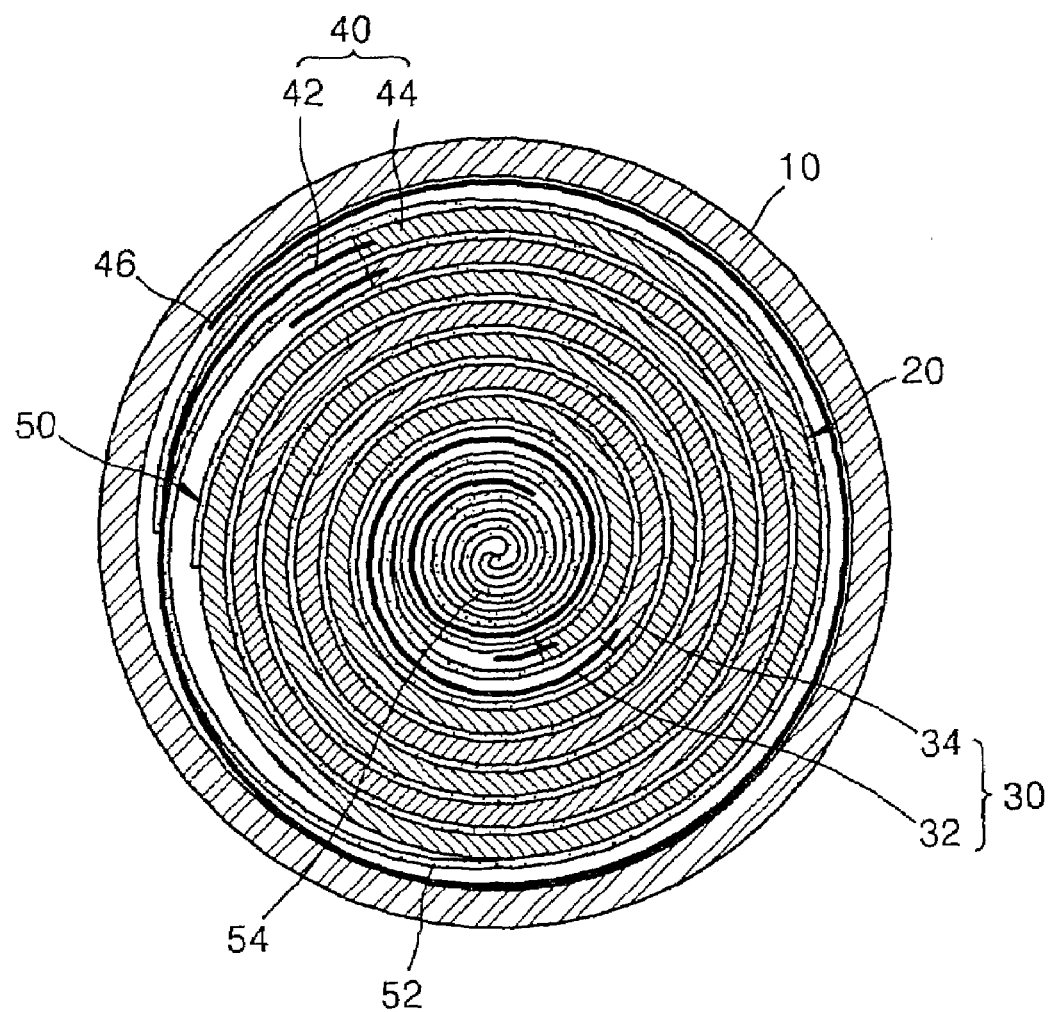
FIG. 5 is a cross-sectional view showing the electrode jelly-roll of a secondary cell according to another preferred embodiment of the present invention.
Figure 6:
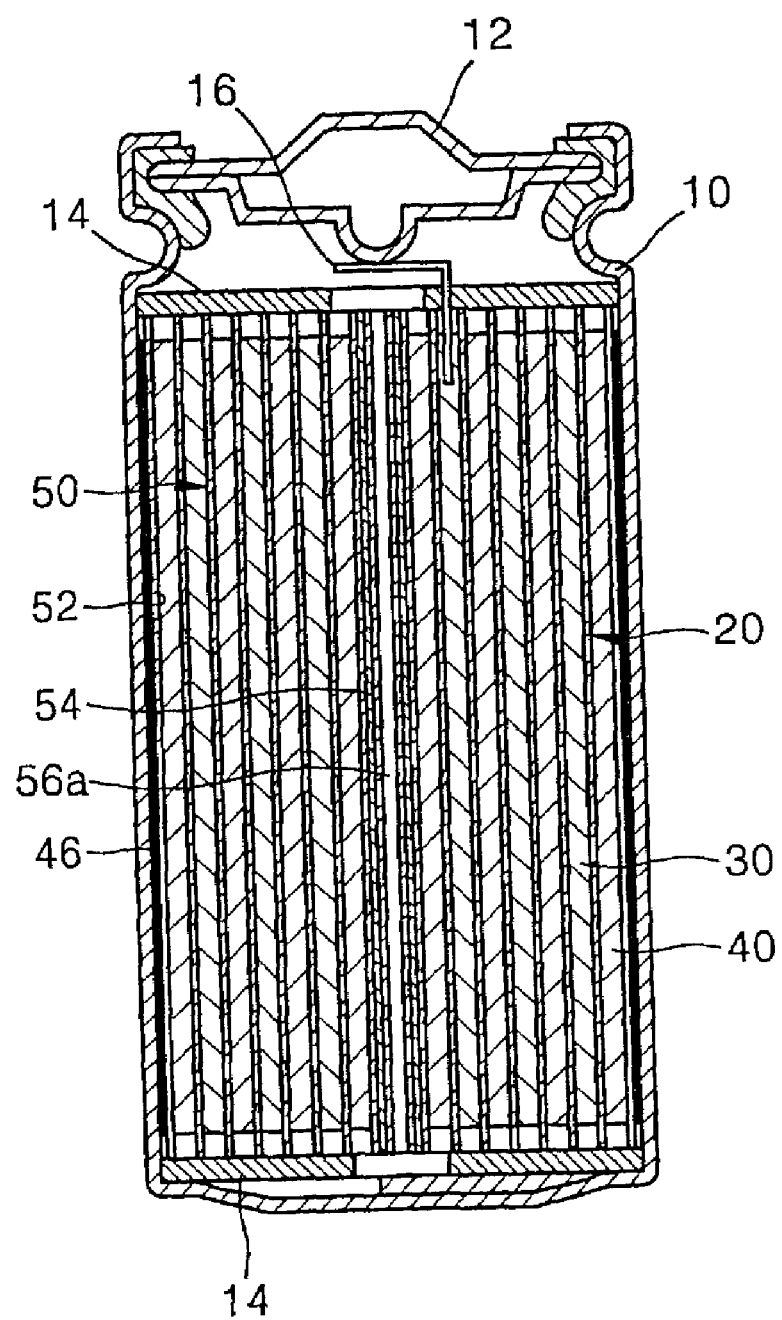
FIG. 6 is a longitudinal sectional view showing the structure of the secondary cell of FIG. 5.

FIG. 5 is a cross-sectional view showing the electrode jelly-roll of a secondary cell according to another preferred embodiment of the present invention. FIG. 6 is a longitudinal sectional view showing the structure of the secondary cell of FIG. 5.

As shown in FIGS. 5 and 6, an additional outermost separator 52 and innermost separator 54 are wound around one more turn, respectively, around the outer surface and at the core of the electrode jelly-roll 20. As described above, as the outermost separator 52 and the innermost separator 54 are cured, they act as a stability enhancer, especially the innermost separator 54 wound at the core of the electrode jelly-roll 20 forms a rod-like stability member 56 after being cured, as shown in FIG. 4.

In the electrode jelly-roll 20 shown in FIGS. 5 and 6, the outermost separator 52 is wrapped around one more turn with the substrate 42 of the anode 40, which is disposed more towards the outside (more towards the exterior such as away from the center of the cell and towards the outside and the can 10 or, wound or stacked more towards the outside) than the cathode 30 rolled together with the separator 50 therebetween. The height of the separator 50 is always over (greater than) the height of the cathode and anode 30 and 40 rolled together, so that the electrode jelly-roll 20 is surrounded by the outermost separator 52 as it is cured. In addition, as the outermost separator 52 is surrounded by the substrate 42 of the anode 40, the heat-dissipating effect is enhanced.

In this structure, the substrate 46 of the anode 40 covering the outside of the electrode jelly-roll 20 contacts the inner wall of the can 10, so that an additional tap, as described in the previous embodiment with reference to FIGS. 2 and 3, is unnecessary. In the present embodiment, the cathode and anode 30 and 40 may be interchangeable.

Figure 7:
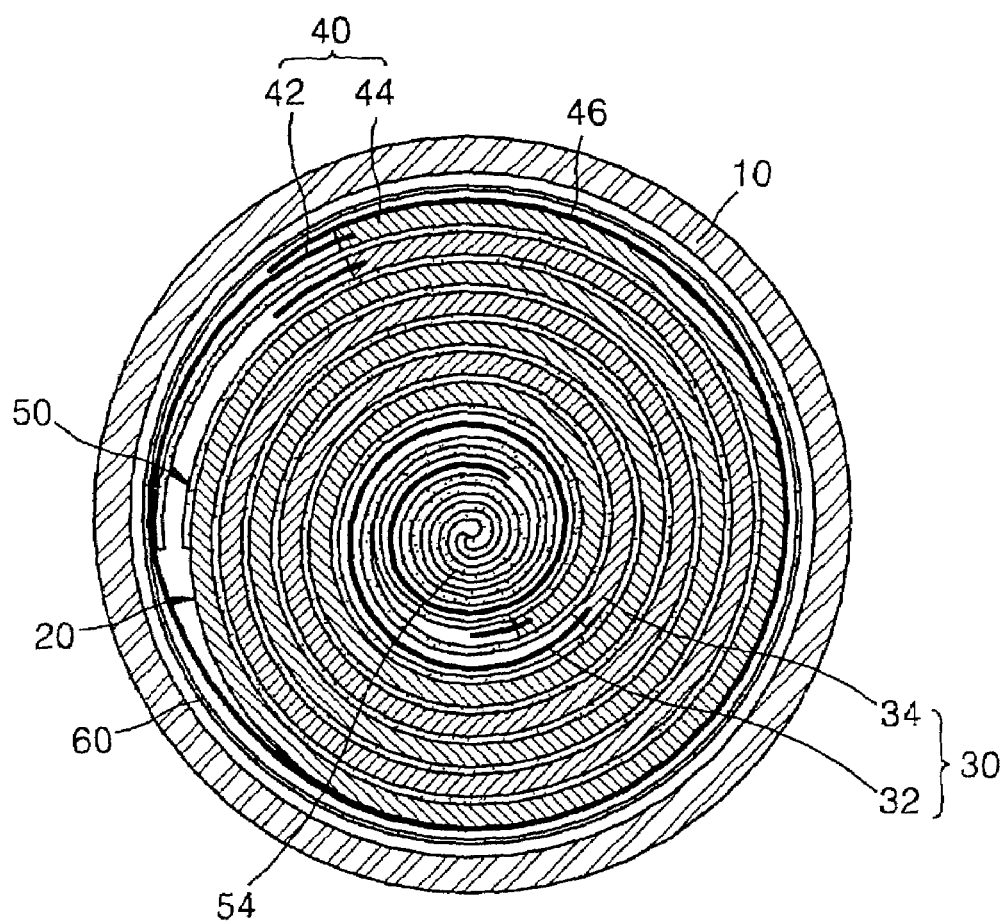
FIG. 7 is a cross-sectional view showing the electrode jelly-roll of a secondary cell according to still another preferred embodiment of the present invention.

FIG. 7 is a cross-sectional view showing the electrode jelly-roll of a secondary cell according to still another preferred embodiment of the present invention. In this embodiment, an innermost separator 54 is additionally wound at the core of the electrode jelly-roll 20 so that it forms a rod-like stability member 56, as shown in FIG. 4, when cured by the heat generated from the cell. An additional polyolefin-based thin film 60 is formed between the outer surface of the electrode jelly-roll 20 and the inner wall of the can 10. An outer substrate 46 may be additionally interposed inside the polyolefin-based thin film 60. The outer substrate 46 is formed by winding the polyolefin-based thin film 60 around one more turn with the substrate 42 of the anode 40, which is disposed more towards the outside (more towards the exterior such as away from the center of the cell and towards the outside and the can 10 or, wound or stacked more towards the outside) than the cathode 30 rolled together with the separator 50 therebetween.

Figure 8:
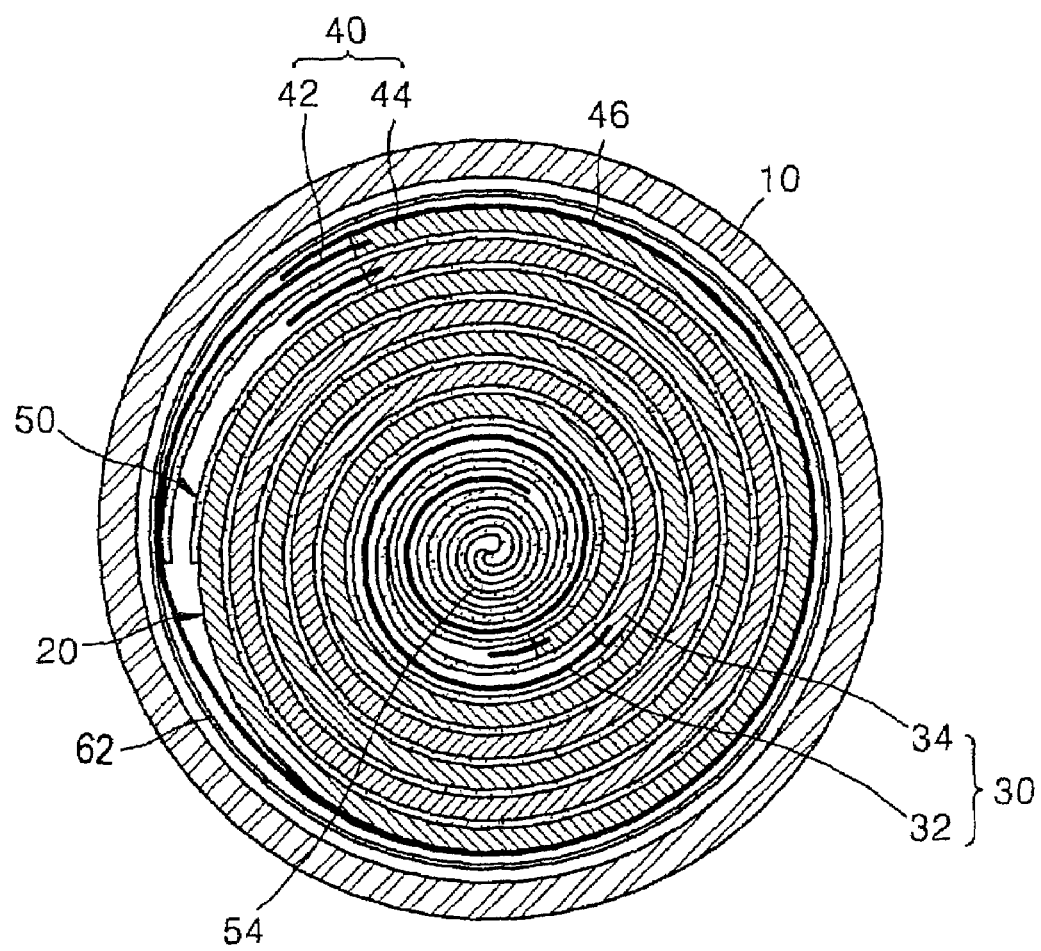
FIG. 8 is a cross-sectional view showing the electrode jelly-roll of a secondary cell according to another preferred embodiment of the present invention.

Like the separator 50, the polyolefin-based thin film 60 formed to surround the outer surface of the electrode jelly-roll 20 may be formed of polypropylene (PP), polyethylene (PE), or a composite of PE/PP/PE/PP. An adhesive film 62, instead of the polyolefin-based thin film 60, can be attached to the outer surface of the electrode jelly-roll 20 after its formation is complete, as seen in FIG. 8.

The polyolefin-based thin film 60 acts as the outermost separator 52 described with reference to FIGS. 3 and 5 and is thermally cured.

In the present embodiment, the anode 40 is made into contact with the can 10 via a tap 10. The anode 40 and the cathode 30 may be interchangeable.

The electrode jelly-roll for a secondary cell according to the present invention having any structure described above provides the following effects.

First, additional turns of separator formed at the core and around the outer surface of the electrode jelly-roll for a cell form a protective structure for the cell so that it has mechanical stability against external impacts.

Second, in addition to the improvement in mechanical stability, the additional innermost and outermost turns of separator can improve the heat-dissipating capability by absorbing the heat generated from the cell to increase thereby the thermal stability of the cell.

Third, since an additional member such as a mandrel is unnecessary, the cell can be tightly rolled with reduced volume and equivalent to or better effects than when using a mandrel.

Fourth, the mechanical and thermal stabilities of the cell can be attained by simply winding an additional turn of separator or substrate without welding or incorporation of an additional member. Therefore, productivity can be increased with reduced processing steps and expenses.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A secondary cell, comprising:
   a can; and
   an electrode jelly-roll wound with two different electrodes and a separator interposed between the electrodes therein and accommodated in said can, an outer surface of said electrode jelly-roll being wound around one more turn with said separator, with only the separator being wound at the core of the electrode jelly-roll to form a stability member, said stability member being cured by absorbing heat generated from said cell.

2. The secondary cell of claim 1, further comprised of a substrate of one of said electrodes being disposed more towards the outside than the other electrode, said substrate not being coated with an active material, surrounds said outer surface of said electrode jelly-roll in contact with an inner wall of said can.

3. The secondary cell of claim 1, further comprised of only said separator being wound at the core of the electrode jelly-roll to form a rod-shaped stability member, said stability member being cured by absorbing heat generated from said cell.

4. The secondary cell of claim 3, said separator wound at the core of said electrode jelly-roll being continuous from a portion of said separator which is stacked with the two different electrodes.

5. The secondary cell of claim 3, further comprised of a substrate of one of said two electrodes being disposed more towards the outside than the other electrode, said substrate not being coated with an active material, surrounds said outer surface of said electrode jelly-roll in contact with an inner wall of said can.

6. The secondary cell of claim 1, said two different electrodes being an anode electrode and a cathode electrode.

7. The secondary cell of claim 1, further comprised of said electrode jelly-roll being wound tighter at core than at outer surface of electrode jelly-roll and with a height of said separator being always over the height of the electrode of the first and second type rolled together accommodating said electrode jelly-roll being surrounded by the outermost and innermost portion of said separator as it is thermally cured inside heat generated by the secondary cell.

8. The secondary cell of claim 1, further comprising a polyolefin-based thin film around the outer surface of the electrode jelly-roll.

9. The secondary cell of claim 1, said separator being formed of at least one member of group consisting essentially of polypropylene (PP), polyethylene (PE), and a composite of PE/PP/PE/PP.

10. The secondary cell of claim 1, further comprised of an outermost portion of said separator being surrounded by said substrate of one of said two electrodes being wound the closest to said can when the outermost portion of said separator is cured.

11. The secondary cell of claim 1, further comprising an adhesive film around the outer surface of the electrode jelly-roll.

12. A secondary cell, comprising:
a can; and
an electrode jelly-roll wound with two different electrodes and a separator interposed between the electrodes therein and accommodated in said can, said electrode jelly-roll including a rod-shaped stability member which is formed by winding only said separator at a core of said electrode jelly-roll and is cured by absorbing heat generated from said cell.

13. The secondary cell of claim 12, said separator wound at the core of the electrode jelly-roll to form the rod-shaped stability member is continuous from a portion of said separator which is stacked with said two different electrodes.

14. The secondary cell of claim 12, further comprising a polyolefin-based thin film around an outer surface of said electrode jelly-roll.

15. The secondary cell of claim 12, further comprised of a substrate of one of the electrodes being disposed more towards the outside than the other electrode, said substrate not being coated with an active material, surrounds an outer surface of said electrode jelly-roll in contact with an inner wall of said can.

16. The secondary cell of claim 15, further comprising a polyolefin-based thin film coating said substrate surrounding said outer surface of said electrode jelly-roll.

17. A secondary cell, comprising:
an electrode jelly-roll wound with two different electrodes and a separator interposed between and through an entire length of the electrodes therein, an outer surface of said electrode jelly-roll being wound around at least one more turn with said separator than the electrodes, and a second separator interposed between the electrodes and not adjacent to said separator, said second separator not being wound beyond the length of both two different electrodes toward an outer periphery of said electrode jelly-roll at an end toward a surface of a can encompassing said electrode jelly-roll, with the separator being hardened with the electrode jelly-roll at an outer portion of the rolled jelly-roll and at the core through curing.

18. The secondary cell of claim 17, further comprised of only said separator being wound at the core of the electrode jelly-roll to form a stability member, said stability member being cured by absorbing heat generated from said cell.

19. The secondary cell of claim 18, further comprised of a substrate of one of said electrodes being disposed more towards the outside than the other electrode, said substrate not being coated with an active material, surrounds said outer surface of said electrode jelly-roll.

20. The secondary cell of claim 19, said separator wound at the core of said electrode jelly-roll being continuous from a portion of said separator which is stacked with the two different electrodes.

21. The secondary cell of claim 20, further comprising a polyolefin-based thin film around the outer surface of the electrode jelly-roll.

22. The secondary cell of claim 21, said rod-shaped stability member having a.

23. The secondary cell of claim 22, said polyolefin-based thin film being formed of at least one member of group consisting essentially of polypropylene (PP), polyethylene (PE), and a composite of PE/PP/PE/PP.

24. A method of making a secondary cell, comprising:
stacking an electrode of a first type, an electrode of a second type, and a separator between said electrode of the first type and said electrode of the second type;
rolling the stack of said electrode of the first type, said separator, and said electrode of the second type to form an electrode jelly-roll;
wrapping an outer surface of said electrode jelly-roll with said separator;
winding only said separator at the core of said electrode jelly-roll to form a stability member, said stability member being cured by absorbing heat generated from said secondary cell.

25. The method of claim 24, with the outer surface of said electrode jelly-roll being wrapped about one more turn with said separator from the end of the electrodes.

26. The method of claim 24, further comprising of surrounding the outer surface of said electrode jelly-roll by a substrate of said electrode of the first type, said substrate of said electrode of the first type being in contact with an inner wall of said can, said electrode of the first type being disposed more towards the outside than said electrode of the second type, said substrate not being coated with an active material.

27. The method of claim 24, further comprising of curing both an outermost portion of the separator and the innermost portion of the separator at the core by the heat generated inside said secondary cell, with the height of said separator being always over the height of the electrode of the first and second type rolled together accommodating said electrode jelly-roll being surrounded by the outermost and innermost portion of the separator when thermally cured inside heat generated by the secondary cell.

28. The method of claim 27, said separator wound at the core of said electrode jelly-roll being continuous from a portion of said separator which is stacked with the electrodes of the first and second type.

29. A method of manufacturing a secondary cell, comprising:
   stacking an electrode of a first type, an electrode of a second type, and a separator between said electrode of the first type and said electrode of the second type;
   rolling the stack of said electrode of the first type, said separator, and said electrode of the second type to form an electrode jelly-roll;
   wrapping an outer surface of said electrode jelly-roll with any one member of a group consisting essentially of said separator and a polyolefin-based thin film;
   winding only said separator at the core of said electrode jelly-roll to form a rod-shaped stability member; and
   curing said stability member being by absorbing heat generated from said secondary cell.

30. The method of claim 29, further comprising of surrounding the outer surface of said electrode jelly-roll by a substrate of said electrode of the first type, said substrate of said electrode of the first type being in contact with an inner wall of said can, said electrode of the first type being disposed more towards the outside than said electrode of the second type, said substrate not being coated with an active material.

31. The method of claim 29, further comprising of:
   wrapping an entire outer surface of said electrode jelly-roll with said polyolefin-based thin film and said polyolefin-based thin film being wound to surround an entire outer surface of the outermost electrode and being thermally cured onto said electrode jelly-roll and interposing an outer substrate of said electrode of the first type inside said polyolefin-based thin film.

32. A secondary cell, comprising:
   a can;
   an electrode of a first type accommodated in said can;
   an electrode of a second type being accommodated in said can, one of the electrode of the first type and the electrode of the second type being an anode electrode and the other one being a cathode electrode; and
   a separator disposed between the electrode of the first type and the electrode of the second type to prevent the electrode of the first type from being electrically connected to the electrode of the second type, the electrode of the first type, the electrode of the second type, and the separator being wound to form an electrode jelly-roll, the separator extending a certain length at the inside end of the electrode jelly-roll beyond the lengths of the electrodes to form a stability member at the core of the electrode jelly-roll, the stability member being cured by the heat generated inside of the secondary cell.

33. The secondary cell of claim 32, further comprised of the separator extending a certain length at the outer end of the electrode jelly-roll beyond the lengths of the electrodes to be wound around an outer surface of the outermost electrode, the outermost electrode being one of the electrode of the first type and the electrode of the second type.

34. The secondary cell of claim 33, further comprised of the separator being wound to cover at least the entire outer surface of the outermost electrode.

35. The secondary cell of claim 32, further comprised of a substrate of one of said electrodes being disposed more towards the outside than the other electrode, said substrate not being coated with an active material, surrounds said outer surface of said electrode jelly-roll in contact with an inner wall of said can.

36. The secondary cell of claim 32, said separator wound at the core of said electrode jelly-roll being continuous from a portion of said separator.

37. The secondary cell of claim 32, further comprising a polyolefin-based thin film being formed around the outer surface of the electrode jelly-roll.

38. A secondary cell, comprising:
   a can;
   an electrode jelly-roll wound with two different electrodes and a separator interposed between the electrodes therein and accommodated in said can, said separator being wound beyond the two different electrodes to cover an outer surface and an inner surface of said electrode jelly-roll by a single turn beyond the two different electrodes, the innermost portion of the electrode jelly-roll being more tightly wound than the outermost portion of the electrode jelly roll with the innermost portion and outermost portions being hardened through thermal curing from heat inside said formed and sealed secondary cell, the innermost portion forming a rod-shaped stability member integrally formed from a portion of the electrode jelly-roll without a separate mandrel, with a substrate of the electrode of the first type covering an outside of said electrode jelly-roll contacting an inner wall of said can; and
   an adhesive film being attached to and surrounding an outer surface of said electrode-jelly roll after the formation of said electrode jelly-roll.

\* \* \* \* \*